United States Patent
Pannicke

(10) Patent No.: US 12,387,245 B2
(45) Date of Patent: Aug. 12, 2025

(54) COMPUTER-BASED METHOD FOR INITIATING COMMUNICATION WITH A PROSPECTIVE CUSTOMER, AND COMMUNICATIONS SYSTEM

(71) Applicant: CHEP Technology Pty Limited, Sydney (AU)

(72) Inventor: Marco Pannicke, Cologne (DE)

(73) Assignee: CHEP Technology Pty Limited, Sydney (AU)

(*) Notice: Subject to any disclaimer, the term of this patent is extended or adjusted under 35 U.S.C. 154(b) by 661 days.

(21) Appl. No.: 17/268,646

(22) PCT Filed: Aug. 16, 2019

(86) PCT No.: PCT/EP2019/072060
§ 371 (c)(1),
(2) Date: Feb. 16, 2021

(87) PCT Pub. No.: WO2020/035614
PCT Pub. Date: Feb. 20, 2020

(65) Prior Publication Data
US 2021/0166281 A1    Jun. 3, 2021

(30) Foreign Application Priority Data
Aug. 17, 2018  (DE) .......................... 102018120076.5

(51) Int. Cl.
*G06Q 30/02*    (2023.01)
*G06Q 30/015*   (2023.01)
(Continued)

(52) U.S. Cl.
CPC ....... *G06Q 30/0281* (2013.01); *G06Q 30/015* (2023.01); *G06Q 30/0641* (2013.01); *H04L 51/02* (2013.01)

(58) Field of Classification Search
None
See application file for complete search history.

(56) References Cited

U.S. PATENT DOCUMENTS

2012/0239499 A1*  9/2012  Zughaib .................. G06Q 30/02
                                                           705/14.58
2014/0358666 A1   12/2014  Baghaie et al.
(Continued)

FOREIGN PATENT DOCUMENTS

CA      2923334 A1    9/2016
CN    101127734 A     2/2008
(Continued)

OTHER PUBLICATIONS

"Top 5 Myths about Bluetooth Beacons." Available at: < https://www.mocaplatform.com/blog/top-5-myths-about-bluetooth-beacons-proximitymarketing#:~:text=Myth%20%C2%BA1%3A%20Beacons%20send%20messages,within%20a%20specific%20mobile%20app.> published on Mar. 17, 2016 (Year: 2016).*

(Continued)

*Primary Examiner* — Richard W. Crandall
(74) *Attorney, Agent, or Firm* — Alston & Bird LLP

(57) ABSTRACT

A computer-based method for initiating communication with a prospective customer by means of a beacon (14) installed on a shop floor (12) is disclosed. The following steps are provided: detecting that a smart device (22) is approaching the beacon (14); transmitting a chat invitation signal to the smart device (22); receiving a chat confirmation signal; and launching a chat on the smart device (22), in particular with a chatbot. A communications system and a computer program are also proposed.

16 Claims, 1 Drawing Sheet

Figure 1:
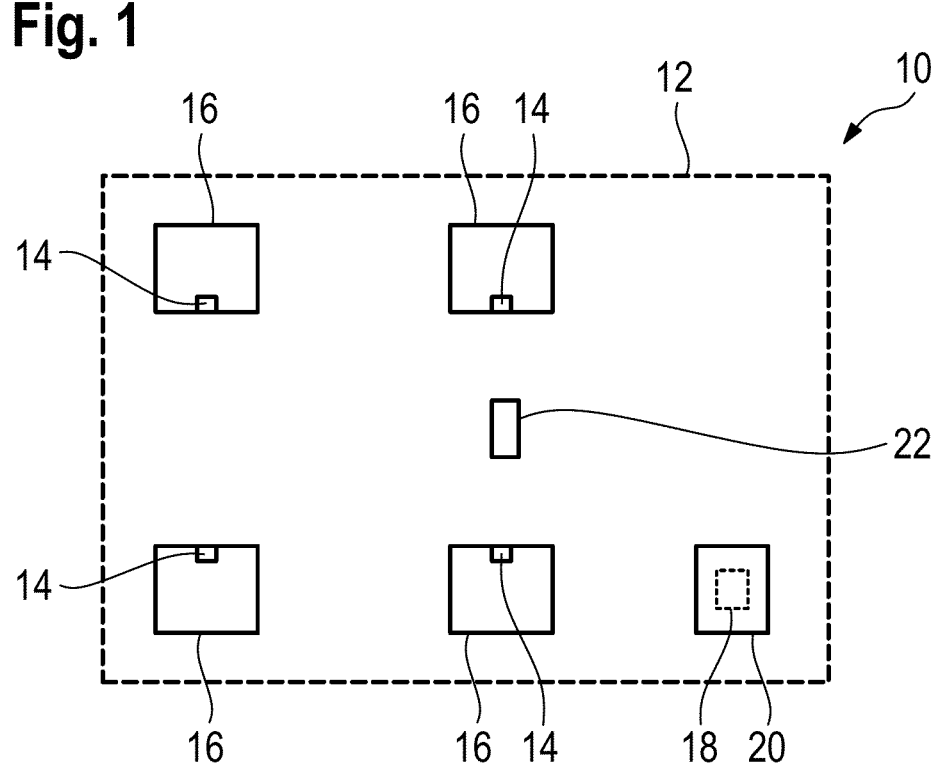

(51) Int. Cl.
*G06Q 30/0601* (2023.01)
*H04L 51/02* (2022.01)

(56) References Cited

U.S. PATENT DOCUMENTS

| | | | |
|---|---|---|---|
| 2015/0312839 A1 | 10/2015 | Trehan | |
| 2015/0317682 A1 | 11/2015 | Kayser et al. | |
| 2016/0092943 A1* | 3/2016 | Vigier | G06Q 10/06311 |
| | | | 705/346 |
| 2016/0135044 A1* | 5/2016 | Altuwaiyan | H04W 4/21 |
| | | | 455/411 |
| 2016/0241660 A1 | 8/2016 | Nhu | |
| 2016/0267485 A1 | 9/2016 | Walz et al. | |
| 2016/0267514 A1 | 9/2016 | Walz et al. | |
| 2017/0053330 A1* | 2/2017 | Smith | G06Q 30/0613 |
| 2017/0140434 A1* | 5/2017 | Lin | G06Q 30/0267 |
| 2018/0063675 A1* | 3/2018 | Raghav | H04L 51/04 |
| 2018/0178671 A1 | 6/2018 | Ji | |
| 2018/0322362 A1* | 11/2018 | Souder | G06F 18/22 |
| 2020/0005117 A1* | 1/2020 | Yuan | G06F 40/35 |

FOREIGN PATENT DOCUMENTS

| | | |
|---|---|---|
| CN | 104506594 A | 4/2015 |
| CN | 104717611 A | 6/2015 |
| CN | 104936128 A | 9/2015 |
| CN | 105472538 A | 4/2016 |
| CN | 105611493 A | 5/2016 |
| CN | 105898706 A | 8/2016 |
| CN | 106850398 A | 6/2017 |
| DE | 20-2017104295 U1 | 11/2017 |
| EP | 3032485 A1 | 6/2016 |
| GB | 2538373 A | 11/2016 |
| KR | 101707982 | 2/2017 |
| KR | 2017-0055726 A | 5/2017 |
| KR | 101863284 B1 | 7/2018 |
| WO | WO-2016/139782 A1 | 9/2016 |
| WO | WO-2018/090139 A1 | 5/2018 |
| WO | WO2020035614 | 2/2020 |

OTHER PUBLICATIONS

Chan, Wendy, "Everything You Need to Know about Bluetooth Beacon and How they Work," Passkit.com, published on Feb. 15, 2017, available at: < https://passkit.com/blog/everything-you-need-to-know-bluetooth-beacons-how-beacons-work/ Feb. 15, 2017> (Year: 2017).*

Baraiya, Sejal, "Setting up new features of nearby api-beacons, message." Medium.com, published on Sep. 19, 2017, available at: < https://medium.com/indianic/setting-up-beacons-and-messages-by-using-nearby-api-devoid-beacon-manager-app-e39da84e1f5e > (Year: 2017).*

Marshall, Tiffany, "In-store Beacons: What are they and what do they do for retail?" [online] available at: < https://bindolabs.com/blog/store-beacons-retail > published on: Aug. 21, 2015 (Year: 2015).*

Customer Contact With Line Beacon and a Smartphone "ChatBOT Guide Service" Release, IMJ Joint Stock Corporation, Mar. 3, 2017, (5 pages), [online] <URL: https:www.dreamnews.jp/?action_File=1&p=0000149621&id=9cdd0f>.

Chilean Office Action for Chiliean Patent Application No. 2021-000401, dated Jun. 5, 2023, (3 pages), Instituto Nacional de Propiedad Industrial INAPI, Santiago, Chile.

Japanese Office Action for Japanese Patent Application No. 2021-507932, dated Apr. 7, 2023, (4 pages), Japan Patent Office, Tokyo, Japan.

International Search Report and Written Opinion for International Application No. PCT/EP2019/072060, dated Nov. 18, 2019, (10 pages), European Patent Office, Rijswijk, Netherlands.

Anonymous "Chatbot" https://en.wikipedia.org/w/index.php?title=Chatbot&oldid=854440661 retreived from internet Oct. 31, 2019; pp. 10.

Beaconstac™. "Eddystone and iBeacon—Comparing The Basics of Beacon Communication Protocols, How They Work and Their Use-Cases," Jan. 15, 2021, (19 pages), [Retrieved from the Internet Nov. 14, 2023] <URL: https://web.archive.org/web/20210115145352/https://www.beaconstac.com/ibeacon-and-eddystone>.

Wikipedia—The Free Encyclopedia. "Bluetooth Low Energy Beacon," Aug. 9, 2018, (7 pages), [Retrieved from the Internet Nov. 14, 2023] <URL: https://en.wikipedia.org/w/index.php?title=Bluetooth_Low_Energy_beacon&oldid=854169761>.

Wikipedia—The Free Encyclopedia. "Google Chrome," Nov. 9, 2023, (43 pages), [Retrieved from the Internet Nov. 14, 2023] <URL: https://en.wikipedia.org/wiki/Google_Chrome#References>.

Office Action for Chinese Patent Application No. 201980068053.8, dated Sep. 9, 2023, (10 pages), China National Intellectual Property Administration, Beijing, China.

Communication Pursuant to Article 94(3) EPC for European Patent Application No. 19758366.9, dated Sep. 21, 2023, (7 pages), European Patent Office, Rijswijk, Netherlands.

* cited by examiner

COMPUTER-BASED METHOD FOR INITIATING COMMUNICATION WITH A PROSPECTIVE CUSTOMER, AND COMMUNICATIONS SYSTEM

The invention relates to a computer-based method for initiating communication with a prospective customer by means of a beacon installed on a shop floor.

It is known from the prior art that "beacons" operating using the Bluetooth standard are used on shop floors, for example in a supermarket. The signals of the beacons can be received by smartphones. As a result, when a prospective customer is in the vicinity of the beacon, they can be sent a notification, for example a notice about a special offer on certain products. In particular, the beacon can be located on a product pallet loaded with said products. When the product pallet is located on a shop floor, the beacon is installed on the shop floor.

One disadvantage of the manner in which a notification is transmitted in the prior art is that the transmission is possible only when the prospective customer has a particular app installed on their smartphone, for example the customer loyalty app of the supermarket chain in whose branch the prospective customer is currently located, or a bonus app covering various supermarket chains.

The object of the invention is to make the prospective customer aware of particular products or services without the customer needing to have the "appropriate" app installed on their smartphone.

To achieve this object, the following steps are provided according to the invention:
 detecting that a smart device is approaching the beacon;
 transmitting a chat invitation signal to the smart device;
 receiving a chat confirmation signal; and
 launching a chat on the smart device, in particular with a chatbot.

The advantage of this method is that a special, supermarket-specific app is not required, but rather the chat is launched in a standard instant messaging app installed on practically every smart device, in particular practically every smartphone. Examples of such instant messaging apps are the Facebook app and WhatsApp.

A particular advantage of the method is that the prospective customer need not log into a website.

The beacon is preferably arranged on a product pallet and linked to the goods loaded thereon, such that the prospective customer can be "spoken to" at the correct time, namely when they are located in the vicinity of the products, regardless of the position of the product pallet on the shop floor.

The notification displayed on the smartphone can indicate to the user that it is possible to chat with an employee, an advisor or customer service such that any questions from the prospective customer can be answered in an automated manner, additional information can be given or an offer customised for them can be provided.

The method according to the invention may proceed as follows:

Various product pallets equipped with beacons are located on a shop floor of a supermarket. Said beacons broadcast product-specific information.

The signals of the beacons can be received by the smartphone of a prospective customer, provided that the smartphone accepts push notifications via Bluetooth and has location services activated.

When a prospective customer reaches the vicinity of a particular product pallet together with their smartphone, a notification is displayed on the smartphone stating that it is possible to chat directly with an employee, customer service or a customer advisor.

If the prospective customer clicks on the notification, a connection to a chatbot is launched in an instant messaging app. This makes it possible to give the prospective customer additional (promotional) information on the products, to provide them with an offer specially customised for them or even to show them product information dynamically depending on the particular location, at which time the prospective customer can give direct feedback.

According to the invention, the object is also achieved by a communications system comprising a beacon that is installed on a shop floor and configured to detect (or "communicate" with) an approaching smart device and broadcast a chat invitation signal to the smart device, and comprising a controller that is connected to the beacon for signal transmission and is configured to carry out an above-described method. As regards the advantages, reference is made to the above explanations. In other words, the beacon is thus configured to communicate with the smart device.

For example, by means of the chat invitation signal, a Universally Unique Identifier (UUID) can be broadcast to the smart device.

The beacon is preferably arranged on a product pallet.

The controller can be integrated in the beacon and/or be part of a separate data processing unit. The separate data processing unit is, for example, a computer, a laptop, a notebook computer, a smartphone or another smart device.

The controller can also be connected, for signal transmission, to a plurality of beacons distributed, for example, over a relatively large shop floor. The various beacons can then be controlled centrally by the separate data processing unit.

According to the invention, the object is also achieved by a computer program comprising program code means for carrying out an above-described method when the computer program is executed on a computer and/or a controller, in particular on a controller of an above-described communications system.

Figure 2:
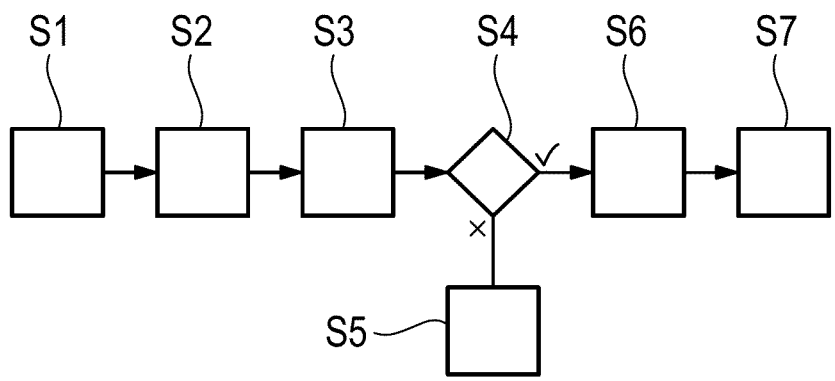

Further advantages and features of the invention will become apparent from the following description and the drawings, to which reference is made and in which:

FIG. 1 is a schematic plan view of a communications system according to the invention; and FIG. 2 is a schematic flow chart of the steps of a method according to the invention.

FIG. 1 schematically shows a communications system 10. The communications system comprises a plurality of beacons 14 arranged on a shop floor 12, the beacons 14 each being attached to a product pallet 16.

The beacons 14 are wirelessly connected to a controller 18 for signal transmission, said controller being arranged in a separate, central computer 20. Alternatively, the controller can also be housed in one of the beacons 14.

The controller 18 is configured to carry out a method for initiating communication with a prospective customer, as described below on the basis of FIG. 2. In particular, a computer program comprising program code means for carrying out the method runs on the controller.

First, it is detected by means of at least one beacon 14 that a smart device 22 is approaching the at least one beacon 14 (step S1). In particular, the smart device 22 is a smartphone.

The beacon 14 then broadcasts a chat invitation notification to the smart device 22 (step S2) and a corresponding notification is displayed to the user (step S3).

In particular, it is displayed to the user that it is possible to chat directly with an employee, customer service or a customer advisor.

The user can now either confirm or reject this chat invitation (step S4). If the user rejects the chat invitation, the communication with the smart device 22 is terminated (step S5).

However, if the user accepts the chat invitation, a chat confirmation signal from the smart device 22 is received by means of the beacon 14 (step S6) and a chat is launched on the smart device 22 (step S7), in particular with a chatbot.

In this case, the chat is launched in an instant messaging app already installed on the smart device. This makes it possible to give the prospective customer additional (promotional) information on the products, to give them an offer specially customised for them or even to show them product information dynamically depending on the particular location (i.e. depending on which of the beacons 14 they are located in the vicinity of), at which time the prospective customer can give direct feedback.

The invention claimed is:

1. A method for initiating communication with a smart device carried by a prospective customer on a shop floor, the method comprising the following steps:
   detecting that the smart device is approaching a beacon of a plurality of beacons installed on the shop floor, wherein each beacon is arranged on a respective product pallet, wherein each product pallet can be moved to different positions on the shop floor;
   transmitting, by the beacon, a chat invitation signal to the smart device;
   receiving a chat confirmation signal from the smart device;
   launching a chat with a chatbot on the smart device, wherein the chat is launched in an instant messaging app on the smart device; and
   displaying, via the instant messaging app, product information relating to a product on the product pallet, wherein the product information is dynamically displayed depending on which beacon of the plurality of beacons the smart device is in the vicinity of.

2. The method according to claim 1, further comprising displaying a notification on the smart device stating that it is possible to chat with an employee, an advisor, or customer service.

3. The method according to claim 1, wherein the instant messaging app is installed on the smart device.

4. The method according to claim 1, further comprising:
   displaying a notification on the smart device stating that it is possible to chat with an employee, an advisor, or customer service; and
   wherein the product information is displayed in the chat launched in the instant messaging app via the chatbot on the smart device.

5. The method according to claim 4, further comprising receiving feedback from the chat launched in the instant messaging app via the chatbot on the smart device regarding the product information.

6. The method according to claim 1, further comprising:
   displaying a notification on the smart device stating that it is possible to chat with an employee, an advisor, or customer service; and
   providing a customized offer in the chat launched in the instant messaging app via the chatbot on the smart device.

7. The method according to claim 6, wherein the customized offer is provided dynamically depending on which beacon of the plurality of beacons the smart device is in the vicinity of.

8. The method according to claim 7, further comprising receiving feedback from the chat launched in the instant messaging app via the chatbot on the smart device regarding the customized offer.

9. A communications system comprising:
   a plurality of beacons installed on a shop floor, wherein each beacon of the plurality of beacons is configured to detect an approaching smart device, wherein each beacon is arranged on a respective product pallet, wherein each product pallet can be moved to different positions on the shop floor; and
   a controller coupled to a beacon of the plurality of beacons, wherein the controller is configured for signal transmission and is configured to perform the following:
   transmit, from the beacon, a chat invitation signal to the smart device;
   receive a chat confirmation signal from the smart device;
   launch a chat with a chatbot on the smart device, wherein the chat is launched in an instant messaging app on the smart device; and
   display, via the instant messaging app, product information relating to a product on the product pallet, wherein the product information is dynamically displayed depending on which beacon of the plurality of beacons the smart device is in the vicinity of.

10. The communications system according to claim 9, wherein said controller is carried by said beacon.

11. The communications system according to claim 9, wherein said controller is carried by a data processing unit separate from said beacon.

12. The communications system according to claim 9, wherein the smart device displays a notification stating that it is possible to chat with an employee, an advisor, or customer service.

13. The communications system according to claim 9, wherein the instant messaging app is installed on the smart device.

14. A non-transitory computer readable medium for operating a communications system, and with the non-transitory computer readable medium having a plurality of computer executable instructions for causing the communications system to perform steps comprising:
   operating a beacon of a plurality of beacons installed on a shop floor to detect an approaching smart device, wherein each beacon is arranged on a respective product pallet, wherein each product pallet can be moved to different positions on the shop floor; and
   operating a controller coupled to the beacon for signal transmission to perform the following:
   transmit, from the beacon, a chat invitation signal to the smart device,
   receive a chat confirmation signal from the smart device,
   launch a chat with a chatbot on the smart device, wherein the chat is launched in an instant messaging app on the smart device, and
   display, via the instant messaging app, product information relating to a product on the product pallet, wherein the product information is dynamically displayed depending on which beacon of the plurality of beacons the smart device is in the vicinity of.

15. The non-transitory computer readable medium according to claim 14, further comprising causing a notification to be displayed on the smart device stating that it is possible to chat with an employee, an advisor, or customer service.

16. The non-transitory computer readable medium according to claim 14, wherein the instant messaging app is installed on the smart device.

\* \* \* \* \*